United States Patent [19]
Tchang

[11] 3,802,776
[45] Apr. 9, 1974

[54] PHOTOMETER FOR DETERMINING THE OXYGEN CONTENT OF BLOOD

[75] Inventor: Gabriel Tchang, Stockholm, Sweden

[73] Assignee: Siemens Aktiengesellschaft, Erlangen, Germany

[22] Filed: Jan. 12, 1972

[21] Appl. No.: 217,163

[30] Foreign Application Priority Data
Mar. 23, 1971 Germany............................ 2114064

[52] U.S. Cl..................... 356/41, 250/218, 356/184
[51] Int. Cl. ............................................ G01n 33/16
[58] Field of Search .............................. 356/39–42, 356/184, 186; 250/218

[56] References Cited
UNITED STATES PATENTS
3,638,640  2/1972  Shaw................................ 356/41 X OTHER PUBLICATIONS
Tait et al.: Medical & Biological Engineering, Vol. 5, No. 5, September 1967, pages 463–472.

Primary Examiner—Ronald L. Wibert
Assistant Examiner—F. L. Evans
Attorney, Agent, or Firm—Richards & Geier

[57] ABSTRACT

A photometer is used for determining the oxygen content of blood by measuring outgoing intensities of light produced by radiation passing through blood or reflected. The light rays being measured have the wave length 805 nm. (isobestical point) and a wave length different therefrom, preferably 650 nm. Corresponding electrical signals are transmitted through a logarithmic device to a difference former. The invention is particularly characterized by the provision of means shifting the outgoing characteristic line of the logarithmic device for the wave length deviating from 805 nm. so as transfer cover-like this line upon the outgoing characteristic line of the logarithmic device for the wave length 805 nm.

1 Claim, 2 Drawing Figures

PHOTOMETER FOR DETERMINING THE OXYGEN CONTENT OF BLOOD

This invention relates to a photometer for determining the oxygen content of blood by measuring light intensities of passing or reflected light having the wave length of 805 nm. (isobestical point) and a wave length different therefrom, preferably 650 nm., whereupon corresponding electrical signals are transmitted through a logarithmic device to a difference former.

Photometers of this type must be adjusted prior to their use in relation to their zero position and its maximum value position (0% $O_2$; 100% $O_2$). The zero point setting takes place in a known manner by the use of reduced (poor in oxygen) blood as a reference medium in such manner that an electrical signal produced from the light and having a wave length deviating from 805 nm. is changed in its amplitude so long until, for example, by changing the amplification degree of an amplifier connected in front of the logarithmic device, or by pushing correspondingly colored glass wedges into the light flow of the corresponding wave, the outgoing signal of the difference former is zero. The seting of the maximum value takes place by using blood which is saturated with oxygen as a reference medium by means of a resistance potentiometer connected behind the difference former.

In order to carry out the actual measurement, blood which is to be measured is introduced into the corresponding light rays instead of the reduced or the oxygen-saturated blood. The amplitude of the electrical signal derived from the 805 nm. wave remains generally constant (isobestic point). The amplitude of signals produced from the second wave is changed, however, corresponding to the oxygen content of blood. The difference signal produced at the outlet of the difference former is a direct measure for the relative oxygen saturation of blood.

Photometers which have to be set according to the described procedure have drawbacks resulting from the fact that the difference of the used electrical signals depends not only from the oxygen content of the blood but also to a great extent from its hemoglobe content (Hb value). Thus the photometer must be reset for each newly used blood or for the same blood which has been changed in its composition, for example, by infusion. This causes a substantial amount of preparatory work, particularly since prior to each new adjustment procedure the newly used blood must be reduced or enriched with oxygen. The preparatory work makes more difficult and expensive the carrying out of the described photometric oxygen measuring process as a whole, and it does not allow the advantageous introduction of these photometers in series investigations.

An object of the present invention is the provision of a photometer of the described type which does not have to be reset when blood is changed, so that the preliminary work prior to actual measuring is reduced to a minimum.

Other objects of the present invention will become apparent in the course of the following specification.

In the accomplishment of the objectives of the present invention it was found desirable to provide means for shifting the outgoing indicating line A (Hb; 0% $O_2$) of the logarithmic device for the wave length deviating from 805 nm., so as to transmit cover-like this indicating line into the outgoing characteristic line A805 nm. (Hb; 0% $O_2$) of the logarithmic device for the wave length 805 nm.

Thus in the photometer of the present invention the single setting made by the manufacturer of the apparatus is carried out so that when reduced blood is used, the outgoing indicating line of the logarithmic device for the wave length deviating from 805 nm. is made to cover the 805 nm. indicating line. The result is that in case of reduced blood the difference between electrical signals is always zero irrespective of its Hb value. Thus the photometer of the present invention does not require any subsequent setting when new blood is used; it is set only once and then it is immediately ready for a large member of measurements without any preparatory work.

The shifting of the indicating line for the wave length deviating from 805 nm. into the 805 nm. indicating line can be carried out without great switch-technical expenditure, since the indicating lines are always linear. The shifting means consist essentially of a swinging member shifting the indicating line for the wave length deviating from 805 nm. into a position parallel to the 805 nm. indicating line, as well as a shifting member for the parallel shifting of this indicating line. As the swinging member is preferably used an amplifier with a variable amplification degree and as the shifting member is advantageously used a resistance potentiometer for changing the reference potential of the amplifier. The swinging and the parallel shifting take place preferably as separate steps which follow each other, so that in case of an alternating use of two different Hb values for the reduced blood, an equal setting of the outgoing signals of the amplifier for both wave lengths takes place by a change in the amplification degree when one is used and by a change in the potentiometer when the other is used. For setting the different Hb values glass filters are preferably used for the wave length deviating from 805 nm., which are correspondingly differently colored.

The invention will appear more clearly from the following detailed description when taken in connection with the accompanying drawings showing by way of example only, a preferred embodiment of the inventive idea.

Figure 1:
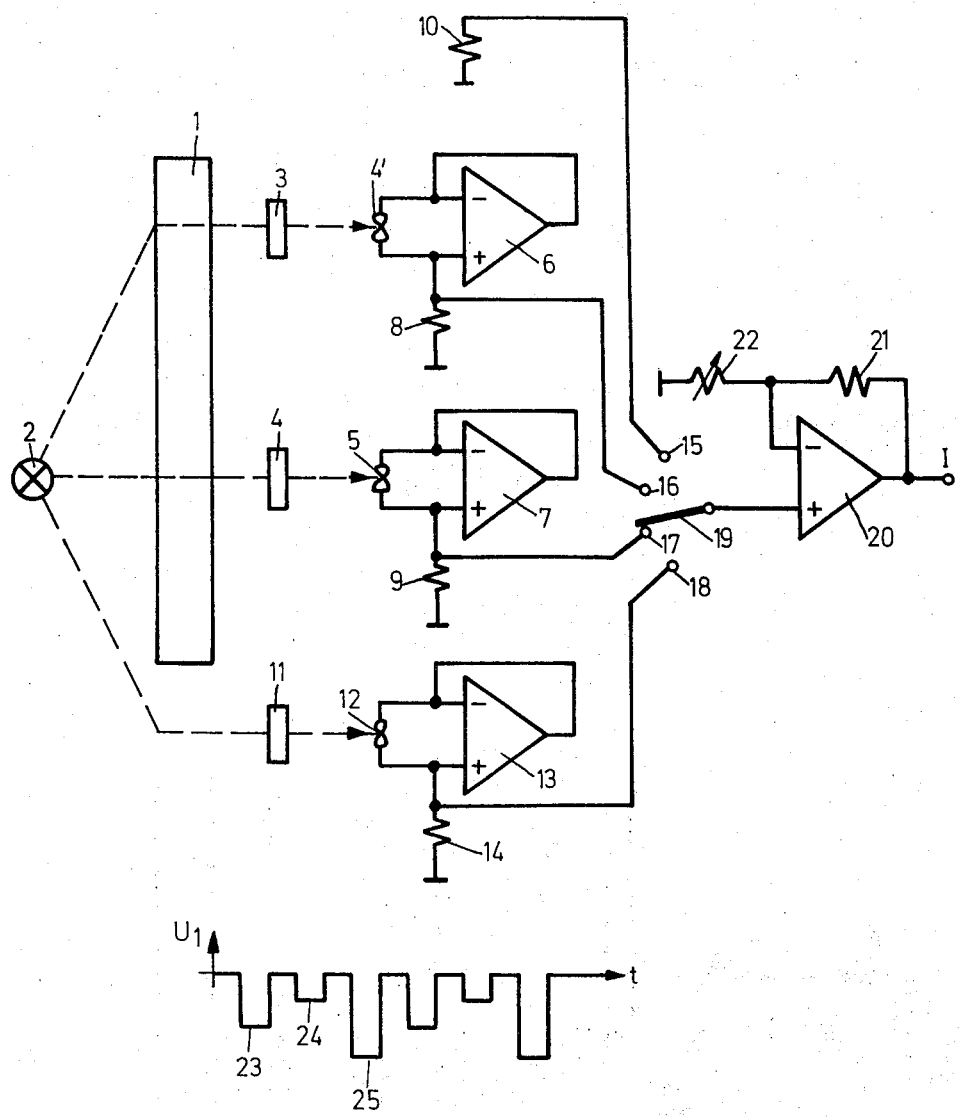
FIG. 1 is a circuit diagram illustrating some of the basic connections of the apparatus of the present invention.

FIG. 1 shows a trough 1 receiving blood which is to be measured by light from a source of light 2. Light leaves the trough 1 in substantially two light ray bundles. A first glass filter 3 is located in the path of the first light ray bundle, while a second glass filter 4 is located in the path of the second light ray bundle. The first glass filter 3 transmits only light having the wave length of 805 nm., while the second glass filter 4 transmits only light having the wave length of 650 nm. Two selenium cells 4' and 5 are provided for determining the intensity of light passing the filters 3 and 4; the cells are connected at the inlets of differential amplifiers 6 and 7, respectively. Due to the high ohmic inlet resistances of the amplifiers 6 and 7 the photo-current produced by the infraction of light upon the selenium cells 4' and 5 will flow substantially undiminished through the ohmic resistances 8 and 9 connected to the non-inverting inlets of the amplifiers 6 and 7. The voltage drop produced at the resistances is directly proportional to the intensity of light which passed the filters 3 and 4.

FIG. 1 also shows by broken lines a third ray of light emanating from the light source 2 which after passing an air stretch or a trough with blood plasma (not shown), passes a further filter 11 for the 805 nm. wave length and reaches a selenium cell 12 which is connected to an amplifier 13 with an ohmic resistance 14 for producing an electrical voltage corresponding to the intensity of this light ray.

The voltages are tested through the resistances 8, 9 and 14 at the corresponding contacts 16, 17 and 18 by means of a diagrammatically illustrated changeover switch 19 (in actual practice it consists of field effect transistors operating as series switches). The switching of the switch 19 takes place in tact with a tact generator (not shown) in such manner that the contacts 16, 17 and 18 are tested one after the other but with an intermediate switching of a reference resistance 10 (zero potential) through the contact 15. Due to this testing scheme a sequence of impulses is produced at the outlet I of a difference amplifier 20 which follows the switch 19 along with switch resistances 21 and 22. The time extension of these impulses corresponds, for example, to the illustrated curve $U_1(t)$. The impulse 23 is then the measure for the intensity of the 805 nm. light ray after the passing of blood (switch 19 at the switch contact 16). Correspondingly the impulse 24 gives the intensity of the 650 nm. light ray (switch 19 at switch contact 17) and the impulse 25 gives the intensity of the 805 nm. light ray after passing the light stretch or the blood plasma (switch 19 at switch contact 18).

Figure 2:
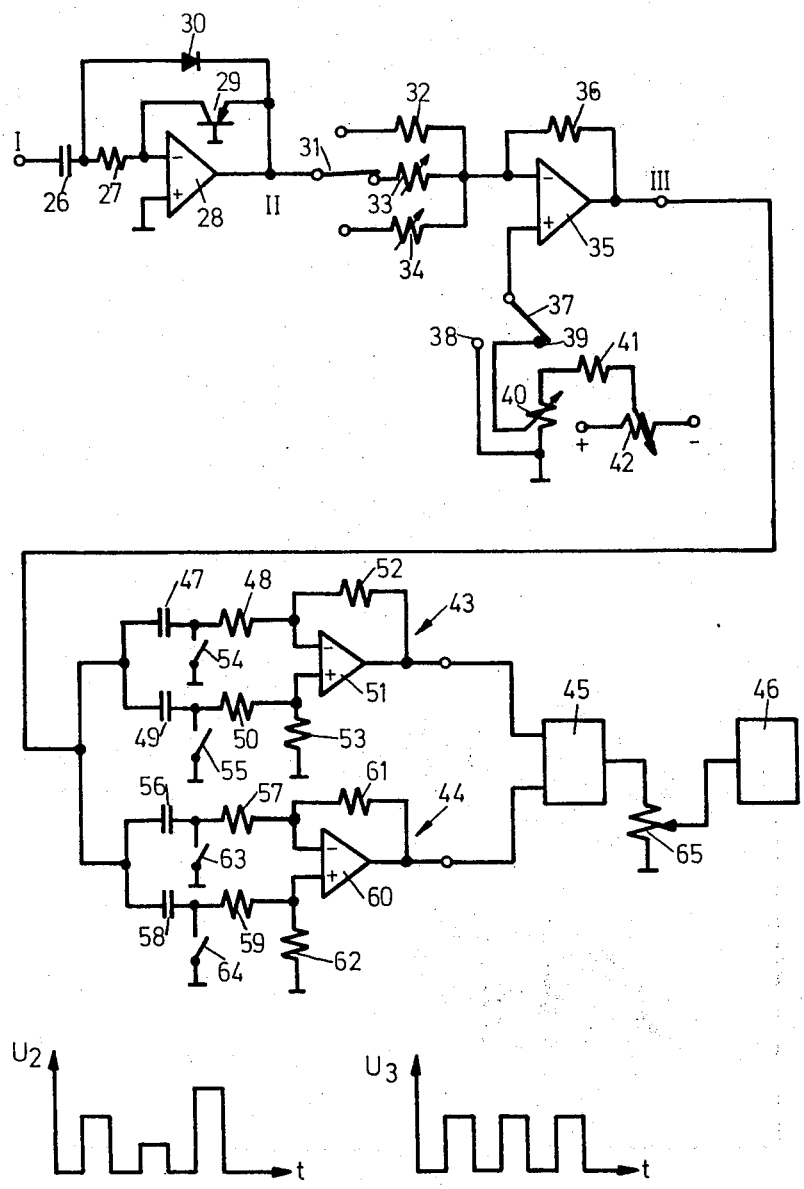
FIG. 2 is a circuit diagram illustrating its additional connections.

As shown in FIG. 2, the impulse sequence $U_1(t)$ produced at the outlet I of the difference amplifier 20 is transmitted through a condenser 26 and an ohmic resistance 27 for its linearization to the inverting inlet of a logarithmic amplifier 28, 29. The diode 30 serves for the zero point stabilization of the logarithmic amplifier 28, 29. Linearized impulses produced at the outlet II of the logarithmic amplifier correspond in their time sequence to the illustrated impulse curve $U_2(t)$.

The logarithmic amplifier 28, 29 has at its outlet II a further changeover switch 31 (for example, field effect transistors operating as series switches) for connecting the amplifier outlet II with the inverting inlet of a difference amplifier 35 with a rear coupling resistance 36, the connection taking place alternately over an ohmic fixed resistance 32 or a first or second resistance potentiometer 33 or 34. The switch 31 is operated in synchronism with the switch 19 at the inlet of the amplifier 20 in that in the switch locations 15 and 16 of the switch 19 the outlet II of the logarithmic amplifier 28, 29 is connected by the switch 31 to the resistance 32 and in the switch locations 17 or 18 of the switch 19 the outlet is connected to the potentiometers 33 or 34, respectively.

The non-inverting inlet of the amplifier 35 can be connected by a third changeover switch 37 (field effect transistor) in a first switch location of this switch (contact 38) directly and in a second switch location (contact 39) over a resistance potentiometer 40 with the mass. The operation of the switch 37 takes place also in accordance with the operation of the switch 19, in that in the switch positions 15, 16 and 18 of the switch 19 the switch 37 is always located at the contact 38 and only in the switch position 17 of the switch 19 the switch 37 is located at the contact 39. The ohmic resistance 41 as well as the resistance potentiometer 42 serve for setting a constant pre-voltage at the potentiometer 40.

Impulses occurring at the outlet III of the amplifier 35 are transmitted simultaneously to two difference formers 43, 44, whereby the difference former 43 must build the difference between the amplitudes of the 805 nm. and the 650 nm. impulse in blood and the second difference former 44 must build the difference between the 805 nm. impulse in air and the 805 nm. impulse in blood. A dividing stage 45 is connected behind the difference formers 43 and 44 for calculating the quotient out of the difference signals of the difference former 43 and the difference former 44. The thus calculated quotient is indicated by means of a suitable indicating instrument, for example, a voltmeter.

The difference former 43 consists essentially of a difference amplifier 51 with ohmic resistances 52, 53, the inverting inlet of which is connected through a condenser 47 as well as a high ohmic resistance 48, while its non-inverting inlet is connected through a further condenser 49 and an ohmic resistance 50 with the outlet of the amplifier 35; the amplifier 51 is also connected with two short circuit switches 54 and 55 (field effect transistors) to switch on electrodes of condensors 47 and 49 which are connected to resistances 48 and 50, to the mass potential. The difference former 44 corresponds to the difference former 43 and consists of a difference amplifier 60 with the ohmic resistances 61 and 62, the condensers 56 and 58 with following resistances 57 and 59, as well as short circuit switches 63 and 64.

The different operations of the difference formers 43 and 44 in relation to the difference formation are based on the different operations of their switches 54, 55 as well as 63 and 64. The operation of these switches takes place depending upon the operation of the switch 19, so that when an 805 nm. impulse for blood appears at the inlet of the difference formers 43, 44 the switches 55 and 63 are closed for a short time, while when a 650 nm. impulse appears only the switch 54 is closed for a short time and when a 805 nm. impulse for air appears, the switch 64 is closed for a short time. Due to this operation of the switches 54, 55, 63 and 64 the desired difference signals are produced automatically at the outlets of the difference formers 43 and 44.

FIG. 2 also shows the arrangement of a resistance potentiometer 65 between the dividing stage 45 and the indicating instrument 46 for setting a voltage which is the maximum one for the instrument 46.

The photometer of the present invention, as illustrated in FIGS. 1 and 2, is operated as follows:

Prior to operation the photometer must be adjusted, namely, it must be set to its zero point and to its maximum value. This adjustment takes place only once, unless by a changing and replacing of structural elements a further setting becomes necessary. The adjustment is usually carried out by the manufacturer.

The setting of the zero point takes place generally in that reduced blood with two different Hb values is used alternately in the trough 1 and during illumination of blood with the first Hb value the magnifying value of the amplifier 35 is changed by the potentiometer 33, while during illumination of blood with the second Hb value the setting of the potentiometer 40 is changed until the difference signals at the outlet of the difference former 43 are zero. The change of the amplifying value of the amplifier 35 causes stepwise a parallel setting of the linear outgoing indicating line $A_{650\ nm.}$ (Hb; 0% $O_2$) of the logarithmic amplifier 28, 29 for the 650 nm. light wave to the outgoing indicating line $A_{805\ nm.}$ (Hb; 0% $O_2$) of the logarithmic amplifier for the 850 nm. light wave as well as the change in the potentiometer setting of the potentiometer 40 in steps to provide a parallel shifting of the 650 nm. outgoing indicating line into the location of the 805 nm. indicating line. The alternating stepwise swinging as well as parallel shifting of the 650 nm. indicating line results in that after a corresponding number of setting steps the 650 nm. indicating line will cover the 805 nm. indicating line. The outgoing signal at the difference former 43 produced during this position of the two indicating lines is then always zero independently from the Hb value of the used blood.

The setting of the maximum value takes place with the use of oxygen-saturated blood by the potentiometer 65 in the already described manner.

The alternating use of reduced blood of different Hb values is purely a question of principle. In actual practice obviously instead of different bloods correspondingly differently colored glass filters will be used for the 650 nm. light wave. Furthermore, the setting of blood can be dropped altogether, when a correspondingly colored glass filter 3 is used for the 805 nm. light wave as well.

The setting of the impulse for the 805 nm. light wave in air takes place by setting to zero the outgoing signal at the difference former 44 by means of the potentiometer 34 by using water, blood plasma or correspondingly colored filters 3 and 11.

After the photometer of the present invention has been set in the described manner it can be effectively used for a large number of measurements. A measurement takes place by filling the trough 1 with the blood to be measured. Depending upon the oxygen content of this blood a differential signal is produced at the outlet of the difference former 43 which is greater or smaller in its amplitude and which is a direct measure for the absolute oxygen content of the blood. At the outlet of the difference former 44, however, a difference signal is produced the amplitude of which is directly proportional to the Hb value of the used blood. Thus, the amount of the relative oxygen saturation (% $O_2$) of the used blood can be read directly in the indicating instrument 46.

The present invention is not limited to the described embodiment. When instead of a single logarithmic amplifier, a total of three separate correspondingly dimentional amplifiers are used, the photometer can be operated, for example, purely with direct current. Then the large number of switches required for the impulse operation (field effect transistors) can be eliminated. Furthermore, it is possible, for example, to use the so-called "TEE circuit" instead of the circuit consisting of the amplifier 35 with the connected resistances 32, 33 and 34 and the switch 31.

I claim:

1. A photometer for determining the oxygen content of blood, comprising light source means transmitting light rays through the blood to be measured, detector means for sensing the intensity of light rays emanating from the blood at a first wave length equal to 805 nm and at least a second wave length of substantially 650 nm and for producing electrical signals corresponding to the sensed intensities, a logarithmation device at the output of said detector means for producing linear outgoing characteristic lines for the signals of the first and second wave lengths, and further comprising shifting means having an amplifier connected to the output of said logarithmation device, first control means for changing the degree of amplification in order to move the outgoing characteristic line of the logarithmation device for the second wave length into a position parallel to the outgoing characteristic line for the first wave length of 805 nm and second control means having a resistance potentiometer for changing the amplifier reference potential in order to produce a parallel shifting of the characteristic line for the second wave length deviating from 805 nm, said first and second control means comprising actuating members for actuating them stepwise one after the other in order to stepwise equalize the amplifier outgoing signals for the two wave lengths when alternately two different Hb values for the reduced blood (0% $O_2$) are used, by changing the amplification degree when one Hb value is used and by varying the amplifier reference potential when the other Hb value is used.

* * * * *

Disclaimer 3,802,776.—*Gabriel Tchang*, Stockholm, Sweden. PHOTOMETER FOR DE-TERMINING THE OXYGEN CONTENT OF BLOOD. Patent dated Apr. 9, 1974. Disclaimer filed Mar. 21, 1983, by the assignee, *Siemens Aktiengesellschaft.*

Hereby enters this disclaimer to the sole claim of said patent.

[*Official Gazette June 7, 1983.*]